Jan. 8, 1952     H. J. RIMBACH     2,581,706
SELF-LEVELING AND STABILIZING JACK
Filed June 25, 1948     2 SHEETS—SHEET 1
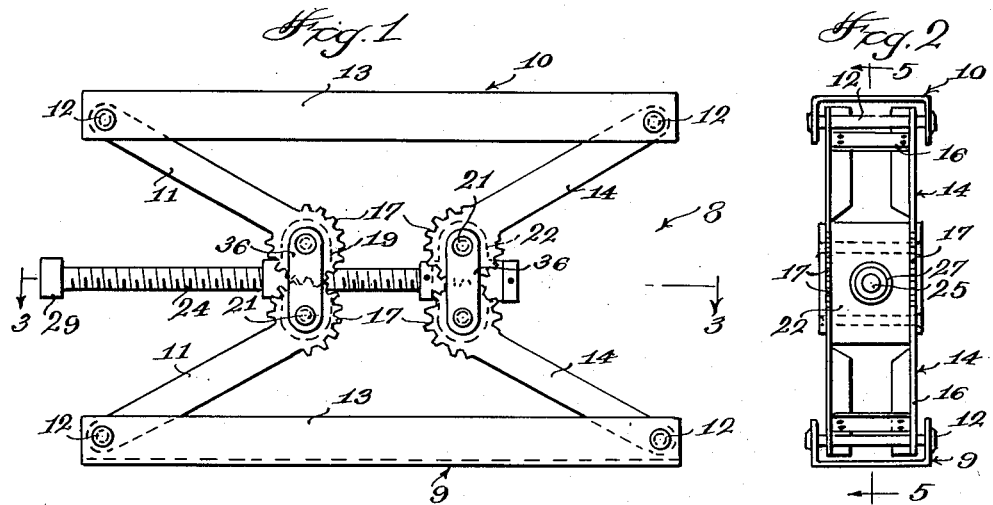
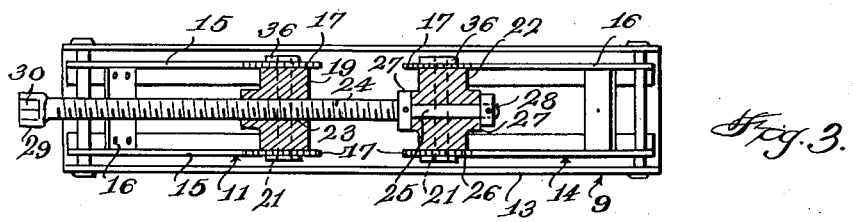
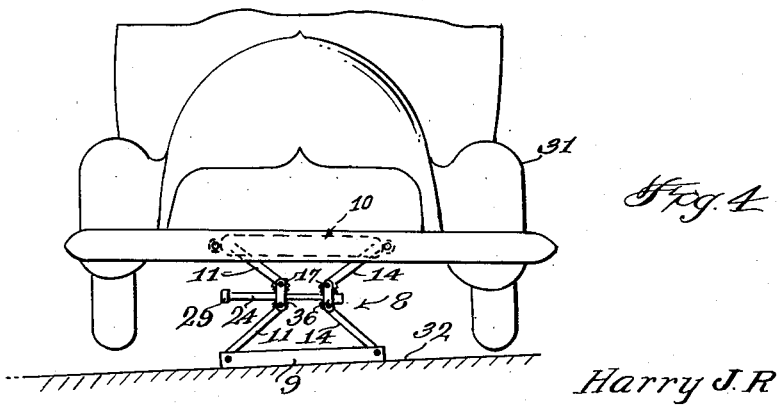
Inventor
*Harry J. Rimbach*
By *John N. Randolph*
Attorney Jan. 8, 1952          H. J. RIMBACH          2,581,706
SELF-LEVELING AND STABILIZING JACK
Filed June 25, 1948          2 SHEETS—SHEET 2
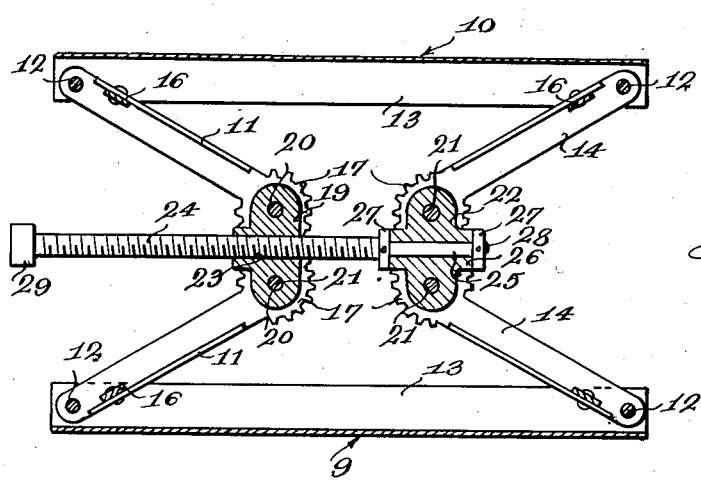
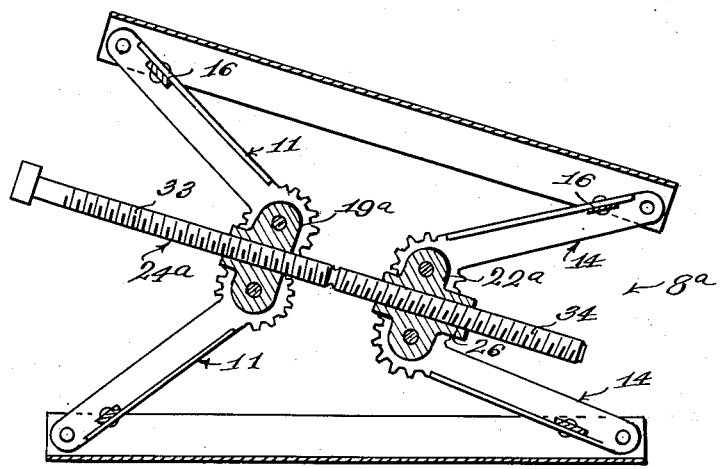
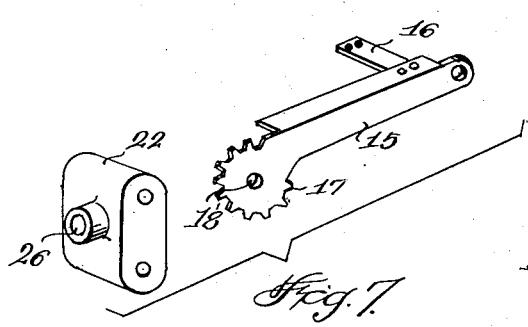
Inventor
Harry J. Rimbach
By John N. Randolph
Attorney Patented Jan. 8, 1952

2,581,706

UNITED STATES PATENT OFFICE 2,581,706

SELF-LEVELING AND STABILIZING JACK

Harry J. Rimbach, Mount Dora, Fla.

Application June 25, 1948, Serial No. 35,085

2 Claims. (Cl. 254—126)

This invention relates to a novel self-leveling and stabilizing jack especially adapted for use on motor vehicles including trailers and which may be utilized either as an attachment permanently fixed to and carried by a vehicle or for detachable application thereto.

More particularly, it is an object of the present invention to provide a jack especially adapted for use as an attachment to be carried by house trailers and whereby one of the jacks may be secured to the under side of the trailer adjacent each corner thereof for elevating and supporting the trailer in substantially a horizontal plane even when disposed over an unlevel surface.

Another and important object of the invention is to provide a jack which obtains its stability through the utilization of intermeshing arms forming connecting linkage which expands from the center of the jack outwardly for exerting uniform pressure along the entire area of the top and base of the jack.

Various other objects and advantages of the invention will hereinafter become more fully apparent from the following description of the drawings, illustrating preferred embodiments thereof, and wherein:

Figure 1 is a side elevational view of one form of the jack and showing the jack in a partially extended position;

Figure 2 is an end elevational view thereof looking from right to left of Figure 1;

Figure 3 is a horizontal sectional view taken substantially along a plane as indicated by the line 3—3 of Figure 1;

Figure 4 is a view similar to Figure 1 on a reduced scale showing the jack applied for elevating an end of a vehicle disposed over an uneven surface;

Figure 5 is a longitudinal sectional view of the jack taken substantially along a plane as indicated by the line 5—5 of Figure 2;

Figure 6 is a sectional view similar to Figure 5 showing a slightly modified form of the jack, and Figure 7 is an exploded perspective view of certain of the parts of the jack.

Referring more specifically to the drawings but first with reference to Figures 1 to 5, the novel self-leveling and stabilizing jack comprising the invention is designated generally 8 and includes a base 9 and a top member 10 each of which parts comprises an elongated channel-shaped member. Said channel-shaped members 9 and 10 are disposed with their open sides facing one another. A rigid link or arm 11 is pivotally connected by a pivot pin 12 which extends through the sides or flanges 13 of the base 9 to one end of said base and a complementary link or arm 11 is similarly connected by a pin 12 which extends through the sides or flanges 13 of the top member 10 to the corresponding end of said top member. Correspondlng arms or rigid links 14 are similarly connected to the opposite ends of the base 9 and top member 10 and said links 11 and 14 extend inwardly and toward one another from their pivoted ends toward their opposite ends.

Each of the links 11 and 14 comprises a pair of corresponding sections 15 of L-shaped cross section having flanges extending toward one another and which are rigidly connected together by a transverse bar 16 so that the sections 15 combine to form a unitary structure and, if desired, it will be readily obvious that said sections could be formed integral by having the inwardly extending flanges thereof extended toward one another and integrally joined. The free ends of the parallel flanges of the sections 15 of the arms or links 11 and 14 are extended and enlarged to form gear segments 17 provided with central openings 18.

An elongated coupling member 19 is disposed between the ends 17 of the arms 11 and is provided adjacent each end thereof with an opening 20 which openings register with the openings 18 for receiving pivot pins 21 which extend therethrough and through said openings 18 for pivotally connecting the ends 17 of the arms 11 to the coupling 19 and for positioning said ends so that the teeth thereof will be in meshing engagement. The ends 17 of the arms 14 are similarly connected pivotally to the ends of a coupling 22 by additional pivot pins 21 and so that the teeth of the gear segments of the links or arms 14 will also be in meshing engagement.

The coupling 19, as best seen in Figure 5, is provided with a transverse threaded bore 23 for threadedly receiving an actuating screw 24 which extends therethrough and which is provided with an unthreaded end 25 which is journaled in a bore 26 which extends transversely through the coupling 22. Said unthreaded portion 25 is provided with thrust collars 27 secured adjacent the ends thereof by pins 28 and which are adapted to bear against the inner and outer sides of the coupling 22. The opposite end of the actuating screw 24 is provided with an enlarged head 29 of noncircular cross section and which is likewise preferably provided with a noncircular outwardly opening socket 30, as seen in Figure 3, so that the exterior of the head 29 may be engaged by a turning tool or a turning tool may be applied to the socket 30 thereof for revolving the screw 24, for a purpose which will hereinafter become apparent.

From the foregoing it will be readily apparent that the screw 24 may be turned in one direction and in so moving will be fed outwardly through the coupling 19 as it revolves relatively to the coupling 22 for drawing said couplings toward one another for moving the arms or links 11 and 14 toward nested positions in either the base 9 or top member 10 to which said arms are pivotally connected and accordingly, said base 9 and top member 10 will be drawn toward one another. Likewise, when the arms 11 and 14 are thus swung on their pivots 12 the meshing gear segments 17 will turn relatively to one another and relatively to the coupling to which said gear segments are pivotally connected. Conversely, when the screw 24 is rotated in the opposite direction the coupling members 19 and 22 will be moved away from one another for causing the arms or links 11 and 14 to move toward extended positions relatively to the base 9 and top member 10 and in so moving will exert a uniform thrust on each end of the base 9 and top member 10 through the pivots 12 since such expansion of the jack is accomplished from the center thereof outwardly and toward the ends of the jack. Assuming that it is desired to jack up an end of a vehicle 31, as illustrated in Figure 4, the top member 10 may be positioned as illustrated in Figure 4 under an end of the vehicle so that the weight of the vehicle end will be balanced thereon and the base member 9 upon a supporting surface 32. With said supporting surface 32 disposed at an incline to the horizontal, it will be readily apparent that as the vehicle 31 is raised, due to the uniform pressure or thrust exerted on both ends of the top member 10, said top member will be caused to assume a horizontal position for leveling the end of the vehicle 31 as it is raised and as a result thereof the base member 9 and top member 10 will be disposed out of parallel relationship.

It will likewise be readily apparent that the top member 10 could be fixedly secured to any suitable part of the underside of an end of the vehicle 31 to be carried thereby so that when required, the jack 8 could be actuated for lowering the base 9 into engagement with the surface 32 for elevating said end and when not in use, the jack could be fully retracted so that the base 9 would be disposed substantially against the top member 10 for positioning the arms 11 and 14, couplings 19 and 22 and the actuating screw 24 substantially within the channels of the base 9 and top 10. It will likewise be readily apparent that the jack 8 may be utilized for lifting the corner of a trailer and that four (4) of the jacks 8 could be secured similarly beneath a trailer frame so that the base 9 of each could be extended downwardly for supporting the trailer in an elevated position.

Figure 6 illustrates a slightly modified form of the jack, designated generally 8a and which differs from the jack 8 only in that the actuating screw 24a is provided with a right-hand threaded end 33, corresponding to the threaded portion of the screw 24 and which threadedly engages the threaded bore of the coupling 19a which corresponds to the coupling 19. The jack 8a also differs from the jack 8 in that the coupling 22a is provided with a threaded bore 26a provided with a left-hand thread to threadedly receive the opposite, left-hand threaded end 34 of the actuating screw 24a so that when the screw 24a is revolved the couplings 19a and 22a will be moved either toward one another or away from one another more rapidly than the couplings 19 and 22. The jack 8a is otherwise identical with the jack 8 and operates in the same manner and for the same purpose.

The pivot pins 20 and 21 are preferably held in applied positions by having their ends extending through and anchored to bars 36 disposed on the outer sides of the segments 17.

Referring to Figure 4, it will be noted that the jack 8 is shown disposed beneath the center of a vehicle, transversely thereof and centered with respect to its longitudinal axis and center of gravity. It will be obvious that the jack 8 or 8a may be similarly disposed beneath either end of the vehicle. As previously stated, the thrust against the ends of the bottom member 9 and the top member 10 is uniform when the coupling members are displaced away from one another to move the links 11, 11 and 14, 14 toward extended straight line positions. Assuming that the front end of the vehicle is resting on an inclined surface 32 as illustrated or that the left front wheel of Figure 4 is provided with a flat or deflated tire so that the left front of the vehicle is below the right front; after the coupling members have been moved away from one another sufficiently to position the base 9 on the surface 32 and the member 10 against the underside of a portion of the vehicle and with the base 9 at an angle to the member 10 as illustrated, further movement of the parts 9 and 10 away from one another will initially elevate the left front of the vehicle relatively to the right front thereof as less force is required to elevate the left front than the right front, since the load shifted to the left front is from the right rear of the vehicle so that the vehicle will fulcrum about a diagonal axis between the right front wheel and left rear wheel and the weight on the right rear of the vehicle will counterbalance in part the weight on the left front end of the vehicle until the front axle is leveled, after which the front end of the vehicle can be raised by the jack with the front axle in a horizontal plane, as illustrated in Figure 4.

Various other modifications and changes are contemplated and may obviously be resorted to, without departing from the spirit or scope of the invention as hereinafter defined by the appended claims.

I claim as my invention:

1. A self-leveling and stabilizing jack comprising an elongated base member, an elongated top member adapted to engage beneath an end of a vehicle to be elevated and transversely thereof, said base member being adapted to rest upon a supporting surface beneath the top member, a pair of arms pivotally connected to the base member, one adjacent each end thereof, a pair of arms pivotally connected to the top member, one adjacent each end thereof, a coupling member pivotally connecting complementary arms of said pairs of arms at their free ends, a second coupling member pivotally connecting the free ends of the other complementary arms of the base and top members, said arms having arcuate toothed portions at their last mentioned, free ends, the toothed portions of the complementary arms of the two pairs of arms being disposed in meshing engagement, said first mentioned coupling having a transverse bore extending therethrough, an actuating screw threadedly engaging said bore and having an unthreaded end, said second coupling having a bore for journaling the unthreaded end of the actuating screw, and means for non-slidably connecting said end to said second coupling member whereby when said adjusting screw is revolved said coupling members will be moved toward or away from one another for exerting a pull or a thrust, respectively, from the center of the jack toward the ends of the base and top member.

2. A self-leveling and stabilizing jack for motor vehicles comprising a pair of coupling members, a pair of arms having complementary ends pivotally connected to each of said coupling members, a base, a top member, said base and top member each being of elongated construction, said top member being adapted to engage under an end of a vehicle and transversely thereof, the free ends of the arms of one of said coupling members being pivotally connected to complementary ends of the base and top member and the free ends of the arms of the other coupling member being pivotally connected to the opposite ends of the base and top member, each pair of arms being swingable independently of the other pair of arms, said first mentioned ends of the arms having arcuate toothed portions, the toothed portions of the arms connected to each coupling member being disposed in meshing engagement, and actuating means engaging said coupling members for moving them toward or away from one another for exerting a pull or thrust, respectively, from the coupling members toward the ends of the base and top member, said intermeshing toothed portions permitting the base and top member to be initially disposed at an angle to one another when the top member is engaging under an end of a vehicle and the base member is engaging a supporting surface thereunder whereby when the actuating means is operated to displace the top member away from the base, the vehicle end will be initially rocked laterally to a horizontal position and thereafter uniformly elevated.

HARRY J. RIMBACH.

REFERENCES CITED

The following references are of record in the file of this patent:

UNITED STATES PATENTS

| Number | Name | Date |
|---|---|---|
| 1,701,314 | Shook | Feb. 5, 1929 |
| 1,786,305 | James | Dec. 23, 1930 |
| 1,888,761 | Foyer | Nov. 22, 1932 |
| 2,071,470 | Marlowe | Feb. 23, 1937 |